April 21, 1942. B. STECHBART 2,280,727
DRIVING MECHANISM
Filed April 19, 1939
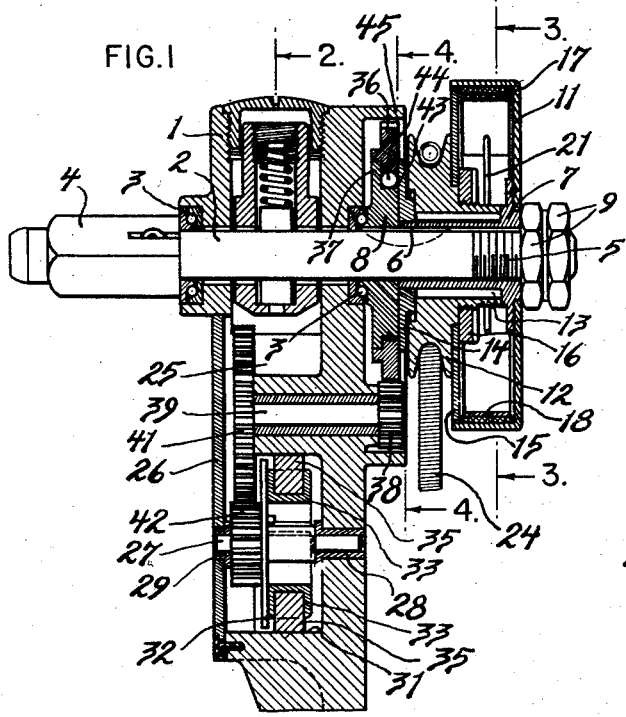
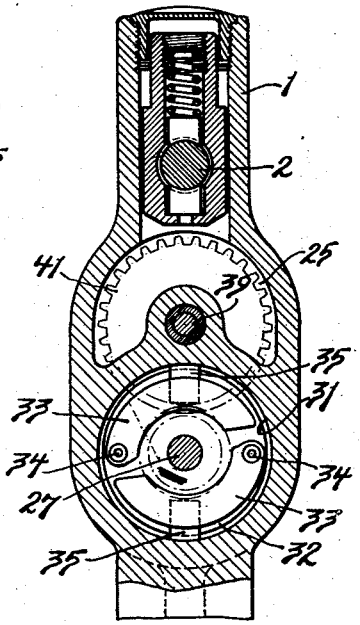
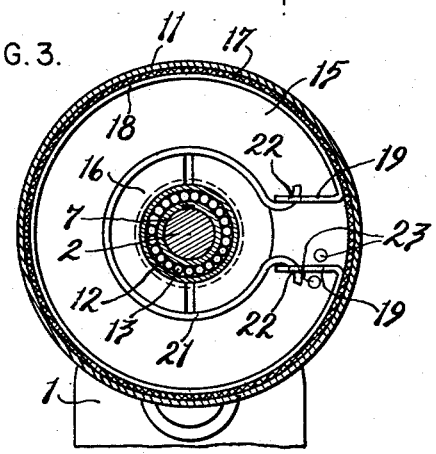
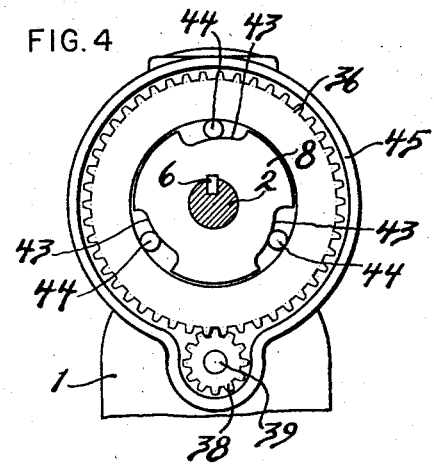
INVENTOR:
BRUNO STECHBART
BY Robert F. Miehle
ATT'Y Patented Apr. 21, 1942

2,280,727

UNITED STATES PATENT OFFICE 2,280,727

DRIVING MECHANISM

Bruno Stechbart, Chicago, Ill., assignor to The Bell & Howell Company, Chicago, Ill., a corporation of Illinois Application April 19, 1939, Serial No. 268,848

10 Claims. (Cl. 242—55)

My invention relates particularly to film reel driving mechanism for motion picture machines although not limited to this use alone.

In the conventional motion picture machine the film is positively driven by the mechanism of the machine and is drawn from a roll thereof on a feed reel and wound on a take up reel which is driven with the machanism of the machine by means of a suitable yielding driving mechanism, the yielding take up mechanism accommodating for the slowing up of the take up reel as the film roll thereon increases in diameter. The conventional yielding take up reel driving mechanism provides a substantially constant power of the driven or take up reel member with the result that the take up tension on the film undesirably decreases as the diameter of the film roll on the take up reel increases.

One object of my invention resides in the provision of mechanism whereby the power of a driven or reel member is automatically varied in inverse correspondence with the speed thereof with a view toward maintaining uniform take up tension irrespective of the diameter of a roll of film on the take up reel. That is to say, the power of the driven or take up reel member is increased as the diameter of the roll of film on the take up reel increases with corresponding decrease in speed of the take up reel.

Another object resides in the provision with such mechanism of means for effecting maximum power of the driven or reel member at high speed for the instant purpose of "rewinding" the film at high speed.

With these objects in view my invention consists in certain features of novelty in the construction, combination, and arrangement of parts by which the said object and certain other objects, hereinafter appearing, are effected all as fully described with reference to the accompanying drawing and more particularly pointed out in the appended claims.

In the said drawing—

Figure 1 is a central vertical sectional view of a driving mechanism embodying my invention;

Figure 2 is a sectional view substantially on the line 2—2 of Figure 1;

Figure 3 is a sectional view substantially on the line 3—3 of Figure 1; and

Figure 4 is a sectional view substantially on the line 4—4 of Figure 1.

Referring to the drawing, I designates a frame, such as a reel arm of a motion picture projector. A film reel spindle 2 extends through the frame I and is rotatably mounted thereon by bearings 3. See Figures 1 and 2. The spindle has both ends thereof projecting from the frame, as designated at 4 and 5, of which the end 4 forms a film reel mount. Keyed, as designated at 6, on the end 5 of the spindle is a bored hub 7 and a bored disk 8 disposed between this hub and the frame I, lock nuts 9 screwthreaded on the spindle end 5 maintaining the assembly and providing axial adjustment thereof.

Secured on the hub 7 is a friction drum 11, and a bored pulley 12 is rotatably mounted on the hub 7 by means of bearing rollers 13, a bored spacing disk 14 being rotatably engaged on the inner end of the hub 7 and interposed between the pulley 12 and the disk 8. A bored disk 15 is secured on the pulley, as designated at 16, this disk forming an enclosure with the friction drum 11.

Friction material 17 is secured on the internal surface of the drum 11, and a friction band 18 is disposed within the drum for expansion against the friction material 17 for frictional engagement therewith. The ends of the band 18 are turned inwardly, as designated at 19, see Figure 3, and an expansion spring 21 has its ends turned outwardly and reversely and engaged through apertures through the ends 19 of the band 18, as designated at 22, to maintain the band 18 in frictional engagement with the friction material 17 of the drum 11. Pins 23, secured on the disk 15, confine an end 19 of the band 18 therebetween to rotatably secure the band with the pulley 12. Thus is formed a friction clutch, which is yieldable in one direction, i. e. counter-clockwise in Figure 3, by reason of the leading end of the band 18 in the counter-clockwise direction being pulled by one of the pins 23 so that the band is not expanded against the friction material of the drum 11 due to the torque imparted to the band in the counter-clockwise direction, for yieldably driving the spindle 2 from the pulley 12 which is driven by a belt 24 from, say, the film feed mechanism of a motion picture projecting machine of which the above described mechanism forms a part.

The frame I forms an enclosure 25 which is substantially closed by a plate 26 detachably secured on the frame. A rotatable shaft 27 extends across this enclosure in parallelism with the spindle 2 and is journaled in a bearing 28 on the frame and in a bearing 29 on the plate 26. The enclosure 25 is formed with a circular internal surface 31 concentric with the shaft 27, and a disk 32 is secured on the shaft. Segmental governor weight members 33 are pivotally mounted at diametrically opposite points on the disk 32, as designated at 34, and are provided at their intermediate portions with outwardly projecting friction brake members 35 frictionally engageable with the surface 31.

Rotation of the shaft 27 effects centrifugal actuation of the governor members 33 outwardly with varying force dependent upon the speed of this shaft to frictionally engage the surface 31 with corresponding varying pressure, thus forming a speed responsive device and a variable friction brake device under the control of the speed responsive device.

The shaft 27, and with it the speed responsive device and the brake device controlled thereby, is driven from the spindle 2 by a multiplying gear train and an automatic one way clutch which will now be described, to vary the power output transmitted by the spindle 2 in inverse correspondence with the speed of the spindle.

A bored gear 36 is rotatably mounted on the disk 8 and is axially confined between the spacing disk 14 and a radial flange 37 on the disk 8. The gear 36 meshes with a gear 38 secured on one end of a counter shaft 39 journaled in the frame 1, and a gear 41 within the enclosure 25 and secured on the other end of this counter shaft meshes with a gear 42 also within the enclosure 25 and secured on the governor shaft 27, thus providing a multiplying gear train for driving the governor shaft of which the gear 36 carried on the spindle 2 is the primary drive gear.

The periphery of the main portion of the disk 8 is provided with a series of circumferentially extending cam depressions 43 and clutching balls 44, disposed in these cam depressions and engaging the same, engage the internal surface of the gear 36 to form an automatic one way driving clutch for driving the governor through the aforesaid multiplying gear train in only one direction of rotation of the spindle 2, i. e. counter-clockwise in Figures 3 and 4, the aforesaid one way clutch being desirably carried on the spindle 2 between the friction driving clutch and the frame 2 as is the primary drive gear 36 forming the driven member of the one way clutch, the gears 36 and 38 being shrouded by a flange 45 on the frame 1.

Assuming the reel spindle 2 to be yieldably driven from the yieldable friction clutch in the direction in which the automatic one way driving clutch drives the speed responsive governor, i. e. counter-clockwise in Figures 3 and 4, say for "take up" purposes, the governor varies the friction of the brake device in proportion to the speed of the spindle, thus varying the power output transmitted by the reel spindle in inverse correspondence with the speed thereof, say for uniform take up tension, the yieldable fricton spindle driving clutch permitting this variance and at the same time permitting varying speeds of the spindle dependent upon the instant diameter of a film roll on a radially winding film strip take up reel driven by the reel spindle.

When the direction of rotation of the reel spindle is reversed, by reversing the direction of rotation of the pulley 12, the aforesaid automatic one way governor drive clutch does not drive the speed responsive governor with the result that the brake device does not function to control the power of the reel spindle, thus permitting maximum power output to be transmitted by the reel spindle for "rewinding" a film at high speed with the film released from the feed mechanism of the machine.

While I have thus described my invention, I do not wish to be limited to the precise details described as changes may be readily made without departing from the spirit of my invention, but having thus described my invention I claim as new and desire to secure by Letters Patent the following:

1. In a device of the character described, the combination with a rotatable driven radially winding strip take up reeling member, of a yielding slip driving device therefor, a speed responsive device driven by said driving device, and a variable brake device under the control of said speed responsive device and operative to vary the power output transmitted by said driven member in inverse correspondence with the speed thereof.

2. In a device of the character described, the combination with a rotatable driven radially winding strip take up reeling member, of a yielding slip driving device therefor, a speed responsive device, a multiplying gear train for driving said speed responsive device from said driven member, and a variable brake device under the control of and operative on said speed responsive device to vary the power output transmitted by said driven member in inverse correspondence with the speed thereof.

3. In a device of the character described, the combination with a rotatable driven radially winding strip take up reeling member, of a yielding slip driving device therefor, a speed responsive device, an automatic one way driving clutch for driving said speed responsive device from said driven member in only one direction of rotation thereof, and a variable brake device under the control of said speed responsive device and operative to vary the power output transmitted by said driven member in inverse correspondence with the speed thereof.

4. In a device of the character described, the combination with a rotatable driven radially winding strip take up reeling member, of a yielding slip driving device therefor, a speed responsive device, a multiplying gear train and an automatic one way driving clutch for driving said speed responsive device from said driven member in only one direction of rotation thereof, and a variable brake device under the control of said speed responsive device and operative thereon to vary the power output transmitted by said driven member in inverse correspondence with the speed thereof.

5. In a device of the character described, the combination with a rotatably mounted radially winding strip take up reel mount spindle, of a yieldable friction clutch for driving the same, a speed responsive device, an automatic one way driving clutch carried by said spindle for driving said speed responsive device from said spindle, and a variable friction brake device and operative through said one way clutch to vary the power output transmitted by said spindle in inverse correspondence with the speed thereof.

6. In a device of the character described, the combination with a rotatably mounted radially winding strip take up reel mount spindle, of a yieldable friction clutch for driving the same, a speed responsive device, a multiplying gear train and an automatic one way clutch for driving said speed responsive devices from said spindle in only one direction of rotation thereof and of which said one way clutch is carried on said spindle and the driven member of said one way clutch carries the driving gear of said gear train, and a variable friction brake device under the control of said speed responsive device and operative thereon to vary the power output transmitted by said spindle in inverse correspondence with the speed thereof.

7. In a device of the character described, the combination with a rotatably mounted radially winding strip take up reel mount spindle, of a yieldable friction clutch for driving the same and carried thereby, a speed responsive device, an automatic one way driving clutch carried by said spindle for driving said speed responsive device from said spindle, and a variable friction brake device under the control of said speed responsive device and operative through said one way clutch to vary the power output transmitted by said spindle in inverse correspondence with the speed thereof.

8. In a device of the character described, the combination with a rotatably mounted radially winding strip take up reel mount spindle, of a yieldable friction clutch for driving the same and carried thereby, a speed responsive device, a multiplying gear train and an automatic one way clutch for driving said speed responsive device from said spindle in only one direction of rotation thereof and of which said one way clutch is carried on said spindle and the driven member of said one way clutch carries the driving gear of said gear train, and a variable friction brake device under the control of said speed responsive device and operative thereon to vary the power output transmitted by said spindle in inverse correspondence with the speed thereof.

9. In a device of the character described, the combination with a frame and a spindle extending therethrough and rotatably mounted thereon and having both ends thereof projecting therefrom and one end of which provides a radially winding strip take up reel mount, of a yieldable friction clutch for driving said spindle and mounted on the other projecting end thereof, a speed responsive device mounted on said frame, a multiplying gear train for driving said speed responsive device with said spindle including a gear carried on said spindle between said frame and said friction clutch, and a variable friction brake device under the control of said speed responsive device and operative thereon to vary the power output transmitted by said spindle in inverse correspondence with the speed thereof.

10. In a device of the character described, the combination with a frame forming an enclosure and a spindle extending therethrough and rotatably mounted thereon and having both ends thereof projecting therefrom and one end of which provides a radially winding strip take up reel mount, of a yieldable friction clutch for driving said spindle and mounted on the other projecting end thereof, a speed responsive device mounted on said frame and disposed within said enclosure, an automatic one way driving clutch and a multiplying gear train for driving said speed responsive device from said spindle in only one direction of rotation thereof, said one way clutch being carried on said spindle between said frame and said friction clutch and the driven member of said one way clutch carrying the driving gear of said gear train and at least part of said gear train being disposed within said enclosure, and a variable friction brake device disposed within said enclosure and under the control of said speed responsive device and operative thereon to vary the power output transmitted by said spindle in inverse correspondence with the speed thereof.

BRUNO STECHBART.